US012346781B2

(12) United States Patent
Butvinik et al.

(10) Patent No.: US 12,346,781 B2
(45) Date of Patent: Jul. 1, 2025

(54) AUTOMATED CONCEPT DRIFT DETECTION IN LIVE MACHINE LEARNING SYSTEMS FOR MACHINE LEARNING MODEL UPDATING

(71) Applicant: Actimize LTD., Ra'anana (IL)

(72) Inventors: Danny Butvinik, Haifa (IL); Yoav Avneon, Ness-Ziyona (IL); Elina Maliarsky, Hod Ha Sharon (IL)

(73) Assignee: ACTIMIZE LTD., Ra'anana (IL)

( * ) Notice: Subject to any disclaimer, the term of this patent is extended or adjusted under 35 U.S.C. 154(b) by 648 days.

(21) Appl. No.: 17/853,189

(22) Filed: Jun. 29, 2022

(65) Prior Publication Data

US 2024/0005199 A1    Jan. 4, 2024

(51) Int. Cl.
*G06N 20/00* (2019.01)
*G06F 18/21* (2023.01)
*G06F 18/22* (2023.01)

(52) U.S. Cl.
CPC ......... *G06N 20/00* (2019.01); *G06F 18/2193* (2023.01); *G06F 18/22* (2023.01)

(58) Field of Classification Search
None
See application file for complete search history.

(56) References Cited

U.S. PATENT DOCUMENTS 11,531,903 B2 * 12/2022 Tamir .................... G06N 20/10
2016/0275411 A1 * 9/2016 Kim .................. G06F 16/24568
2017/0103340 A1 * 4/2017 Zoldi ....................... G06N 5/02
2019/0171428 A1 * 6/2019 Patton ...................... G06F 8/60
2019/0197431 A1 * 6/2019 Gopalakrishnan ..... G06N 20/00
2022/0124002 A1 * 4/2022 Millerand ........... H04L 67/1008
2022/0156578 A1 * 5/2022 Allahdadian ........... G06F 17/18

(Continued)

FOREIGN PATENT DOCUMENTS

CN    112131575 A  * 12/2020  ........... G06F 21/554

OTHER PUBLICATIONS

Bayram et al., "From Concept Drift to Model Degradation: An Overview on Performance-Aware Drift Detectors," Mar. 21, 2022, https://arxiv.org/abs/2203.11070.*

(Continued)

*Primary Examiner* — Ryan Barrett
(74) *Attorney, Agent, or Firm* — Haynes and Boone, LLP

(57) ABSTRACT

A machine learning (ML) system and methods are provided that are configured to detect concept drift in ML models. The system includes a processor and a computer readable medium operably coupled thereto, the computer readable medium comprising a plurality of instructions stored in association therewith that are accessible to, and executable by, the processor, to perform drift detection operations which include receiving a first data set for use during online training of a first ML model, determining a change to an uncertainty bound metric associated with classifiers for features utilized by the first ML model, identifying that the first data set causes the concept drift with the online training of the first ML model, determining characterization information about a type of the concept drift, generating an ML update paradigm based on the concept drift and the characterization information, alerting an ML model updater of the ML update paradigm.

20 Claims, 6 Drawing Sheets

(56) References Cited

U.S. PATENT DOCUMENTS

| | | | | |
|---|---|---|---|---|
| 2022/0379923 | A1* | 12/2022 | Hagaribommanahalli | G05D 1/617 |
| 2023/0040284 | A1* | 2/2023 | Ali-Tolppa | H04L 63/126 |
| 2023/0061268 | A1* | 3/2023 | Schardt | G06N 20/00 |
| 2023/0069347 | A1* | 3/2023 | Backhus | G06N 5/04 |
| 2023/0117088 | A1* | 4/2023 | Lin | G06N 20/00 706/45 |
| 2023/0385838 | A1* | 11/2023 | Butvinik | G06Q 20/4016 |
| 2025/0077935 | A1* | 3/2025 | Butvinik | G06N 20/00 |

OTHER PUBLICATIONS

Halstead et al., "Analyzing and repairing concept drift adaptation in data stream classification," May 24, 2021, https://link.springer.com/article/10.1007/s10994-021-05993-w.*

Gemaque et al., "An overview of unsupervised drift detection methods," Jul. 21, 2020, https://wires.onlinelibrary.wiley.com/doi/10.1002/widm.1381.*

* cited by examiner

AUTOMATED CONCEPT DRIFT DETECTION IN LIVE MACHINE LEARNING SYSTEMS FOR MACHINE LEARNING MODEL UPDATING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to artificial intelligence (AI) and machine learning (ML) systems and models, such as those that may be used for fraud detection with financial institutions, and more specifically to a system and method for identifying concept drift during online training of ML models.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Banks and other financial institutions may utilize ML models and engines to detect instances of fraud and implement anti-fraud solutions. In traditional ML model training, a model is trained using historical data in a batch setting, which is fitted to the data set in an initial training step. This results in a static model, which must be retrained in order to learn from new data. In many cases, this may not be efficient and if the model is trained using static batch data, there may be a need to maintain a training data set, monitor real-time performance of the ML model over time, perform model retraining, other otherwise adjust the ML model and/or training data set.

With online ML model training, model training may be done when data becomes available in a sequential order, such as live or streaming data. This sequential data may be used to update the best predictor for future data at each step, as opposed to batch learning techniques that generate the best predictor by learning and training on the entire training data set at once and in a static manner. Online learning and ML model training may be used in areas of ML training where it may be computationally infeasible to train over the entire dataset at multiple different times, which may require out-of-core algorithms. Online learning may also be used in situations where it is necessary for the ML algorithm to dynamically adapt to new patterns in the data, or when the data itself is generated as a function of time (e.g., stock price prediction). However, online learning models may be prone to inefficient mechanisms of when and how often to update the online ML model using new training data.

Thus, concept drift in ML model features and classifiers may present a major obstacle to sustaining robust and efficient online ML. In predictive analytics and ML, concept drift may correspond to statistical properties of a target variable, which the model is trying to predict, that change over time in unforeseen manners due to changing live data. This may cause the predictions of the ML model to become less accurate as time passes, new data trends occur, and further online ML training is performed. Thus, there is a need to develop a separate mechanism for drift detection to solve problems of changing statistics in the live data for online training.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
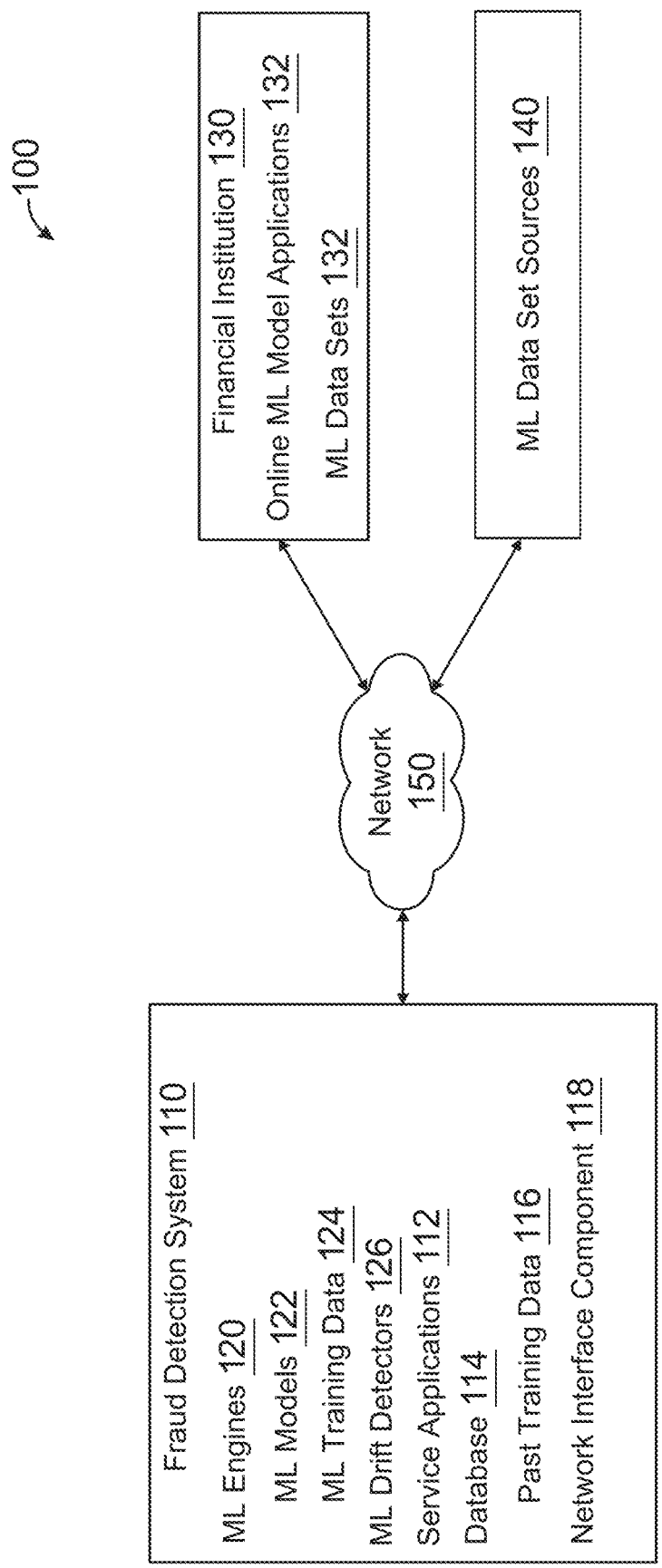
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to provide for concept drift detection for an online ML model, the online ML model may be trained and monitored as discussed herein. ML models may be built on different tenants of a fraud detection and/or ML model training system, such as different financial institutions, and using live or sequential data received over time. These ML models may therefore be updated when concept drift occurs, and therefore may better maintain accuracy for changing data trends. A current model may be trained on historical data to detect future frauds for a tenant; however, this approach may not be efficient and may perform poorly on more recent data where concept drift has occurred or is occurring. To increase performance and catch evolving trends and patterns within fraud, financial, or other changing data, the model must be re-trained often using new data, which may require time and maintenance. More efficient and timely updating may be performed by detecting concept drift as discussed herein.

Thus, online ML models may detect and adapt to evolving trends and new patterns by training the models on-the-fly and as the data is received. A proper mechanism for ML model updating utilizes real data streams and/or live data. There is a need to identify concept drift when it occurs, however, to more advantageously update to the ML model in a timely manner. Identifying concept drift may include detecting changes in data variable's relationships within datasets. This could be steady change over time, periodic or recurring changes (e.g., based on seasonal data), sudden sweeping changes (e.g., caused by a new event or occurrence, such as the COVID-19 lockdowns that significantly changed customer behavior), or any combination thereof.

Initially, an online ML model may be trained using history data to provide a background to the model. The online model may then be deployed into a production environment, where new inquiries are received, and labels are predicted by the ML model. Based on the predicted and labeled transactions, as well as additional online data and predicted variables, online concept drift detection is performed on the data. If there is a concept drift of one or more variables, the type of drift is determined, and one or more alerts are sent to the online model for signaling the update mechanism inherently built into the online model. The update mechanism may then update the online model accordingly and the flow may restart from the beginning for model maintenance and concept drift detection. Thus, the update mechanism and system may correspond to an active updater that triggers the update mechanism within online model when a concept drift occurs. If no drift is detected, or the drift is below a minimum threshold, the system may not send any signal to the online model and preserve computational power by reducing and/or eliminating ineffective actions.

Online concept drift detection may be detected using uncertainty bounds (UB). An UB metric may correspond to a metric that has its value in the range of zero to one. UB may be computed from classifiers without explicit margins. Classifiers, such as incremental decision trees and discrete class labels that may be returned by a ML model, may not have an intuitive margin for identification of positive (fraud), negative (no fraud), uncertain (occurring within a boundary of uncertainty of the classification), or other classifiers for predictive outputs. These ML models may therefore be unstable and reduce the number of features used to build the models. In order to make these online ML models more robust and to distribute weights across features, the ML models may utilize a feature bagging ensemble technique. Feature bagging may improve generalization of unstable classifiers by training multiple base ML models of the classifier on different subset of features from the original D-dimensional data space. Thus, feature bagging may select subsets of features for ML model training instead of using all features from the D-dimensional data space associated with the variables in the data sets. For feature bagging and determination of a UB metric, a change scenario may be established by generating an initial distribution of X samples (e.g., 500 samples), used for training a model, and then generating X additional samples from a changed distribution for testing the model. The change in UB is evaluated as the difference in margin densities of the training and test data.

SHapley Additive exPlanations (SHAP) may be run on transactions or other feature data sets for each model in order to provide an ML model explanation of feature importance. SHAP provides a contribution of each feature to each model and allows for converting local interpretations to global interpretations. Further, SHAP allows for generating statistics regarding the performance of each feature for each ML model using "SHAPley" or "Shapley" values, where the higher the value is in the ML model explanation, the higher the contribution that the feature has in the final prediction by the model. Thus, features may be ranked based on the ML model explanation and Shapley values. The SHAP values may be utilized to measure the impact of each feature that the ML model is trained on. Each feature has its own contribution to the final decision of the model prediction. A feature's SHAP value allow for estimating the strength of such feature's contribution relatively to all contributing features, and therefore each feature may have a distribution of SHAP values per feature over a series of tasks (e.g., computed for different data sets' variables over time), which allows calculation of a covariance measure to advantageously detect concept drift. This algorithm calculates the covariance between SHAP values and allows for determination of a shape, curvature, and slope of the covariance. Utilizing this information, an amount and type (e.g., gradual, abrupt, etc.) of drift may be determined.

The embodiments described herein provide methods, computer program products, and computer database systems for an ML system for detecting and alerting on concept drift for online ML models and systems. A financial institution or other service provider system may therefore include a fraud detection system that may access different transaction data sets and detect fraud using online ML models that are monitored for concept drift. The system may analyze SHAP values for a calculated covariance measure that may be plotted and used for concept drift characterization. The system may then alert on concept drift for further online ML model training. Once online ML models are generated and updated as described herein, the online ML models may be deployed for intelligent fraud detection or other predictive analytic systems.

According to some embodiments, in an ML system accessible by a plurality of separate and distinct organizations, ML algorithms, features, and models are provided for identifying, predicting, and classifying concept drift during live model training in online environments, thereby providing faster and more precise updating and predictive analysis by ML systems.

Example Environment

The system and methods of the present disclosure can include, incorporate, or operate in conjunction with or in the environment of an ML engine, model, and intelligent system, which may include an ML or other AI computing architecture that includes a concept drift detection system.

FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, ML, neural network (NN), and other AI architectures have been developed to improve predictive analysis and classifications by systems in a manner similar to human decision-making, which increases efficiency and speed in performing predictive analysis of transaction data sets. One or more devices and/or servers may be operated and/or maintained by the same or different entities.

FIG. 1 illustrates a block diagram of an example environment 100 according to some embodiments. Environment 100 may include a fraud detection system 110, a financial institution 130, and ML data set sources 140 that interact to provide intelligent detection and/or prevention of fraud or other predictive decision-making through online training of one or more ML models that utilize concept drift detection and characterization as discussed herein. In other embodiments, environment 100 may not have all of the components listed and/or may have other elements instead of, or in addition to, those listed above. In some embodiments, the environment 100 is an environment in which concept drift detection may be performed through an ML or other AI system. As illustrated in FIG. 1, fraud detection system 110 might interact via a network 150 with financial institution 130 and ML data set sources 140, which generates, provides, and outputs UB metrics and SHAP values for feature relevance used for classifications in ML models during online training for use with concept drift detection.

Fraud detection system 110 may be utilized in order to determine an ML model for use by financial institution 130. For example, ML engines 120 provided for use by online ML model applications 132 of financial institution 130 may include one or more of ML models 122 trained (e.g., in pre-production) and/or tuned (e.g., in post-production, such as during online training and/or live use in a production computing environment) using past training data 116 and ML training data 124. Fraud detection system 110 may further provide ML drift detectors 126, which may be configured to detect concept drift in ML models 122 based on changes, traits, or trends in data sets used by ML models 122. For example, initially ML models 122 may be trained on past training data 116 from database 114, which may correspond to historical data used to provide a basis or background to each of ML models 122. This may include identifying variables in past training data 116, performing feature engineering and/or selection of features associated with these variables used by ML models 122, and using one or more ML algorithms, operations, or the like (e.g., including configuring decision trees, weights, activation functions, input/hidden/output layers, and the like). After initial training, online ML models for ML models 122 may be deployed in a production computing environment to receive inquires and data for features and predict labels or other classifiers from the data (e.g., whether input transaction data indicates fraud or not).

After training and deployment, one or more ML engines 120 may be used with ML training data 124 to detect concept drift by ML drift detectors 126. Thus, post-training ML model tuning (e.g., using additional live or sequential data after initial training of the ML model using a selected data set) may be performed using different operations executed by ML drift detectors 126 with ML models 122 and ML training data 124. For example, during concept drift detection initial concept drift is detected as UB metrics meeting or exceeding a threshold value within a range computed from the classifiers of ML models 122 with ML training data 124. A change in UBs based on an output classifier may be evaluated as a difference in UB between the training and test data set, where the training data set may include past training data 116 and/or other historical data, and the test data set may include ML training data 124 and/or ML data sets 134. Sampling and/or feature data bagging may be performed in order to reduce a size of input data and features that are used to train multiple base models of the classifier. Thereafter, the delta or change in UB may be calculated using $\Delta UB = |UB_{Train} - UB_{Test}|$ and the value compared to the range and threshold to identify concept drift.

To determine the type of concept drift, SHAP values may be used. Feature relevance may be determined through SHAP (or Shapley) values, where a SHAP value estimates a strength of a feature's contribution to the classifier or output classification that is relative to all contributing features. For example, with input features for transactions, a monthly income, monthly expenses, number of transactions, and/or loan payments may be used as input features to one of ML models 122, where a classifier of detected potential fraud (e.g., a prediction of fraudulent or not fraudulent) may be output by that ML model. A significant change in SHAP values of certain features over time may indicate concept drift in the corresponding one of ML models 122. For example, with 4 input features, SHAP values changing from initial training or at some later time to different SHAP values at a more current time for sequential data sets may indicate concept drift. Distribution of SHAP values and a calculated covariance that measures the gradient and magnitude to how those move with relation to each other feature may be used to identify the type of concept drift. Output of ML drift detectors 126 may include an update alert for the corresponding one of ML models 122, as well as information for when the drift started, when the drift ended (if so), and/or a drift type (e.g., sudden, incremental, gradual, recurring, a blip, and/or noise). Certain types of drift may not lead to further training and/or tuning, such as a blip or noise that reverted after the detected change and concept drift. However, others may be used to generate an ML update paradigm that is provided to an ML updater for ML model updating.

One or more client devices and/or servers may execute a web-based client that accesses a web-based application for fraud detection system 110, or may utilize a rich client, such as a dedicated resident application, to access fraud detection system 110, which may be provided by service applications 112. These client devices may utilize one or more application programming interfaces (APIs) to access and interface with service applications 112 and/or ML engines 120 of fraud detection system 110 in order to schedule, review, and execute ML modeling and concept drift detection using the operations discussed herein. Interfacing with fraud detection system 110 may be provided through an application for service applications 112 and/or ML engines 120 and may be based on data stored by database 114, fraud detection system 110, financial institution 130, and/or ML data set sources 140. The client devices might communicate with fraud detection system 110 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between the client devices and fraud detection system 110 may occur over network 150 using a network interface component of the client devices and a network interface component of fraud detection system 110. In an example where HTTP/HTTPS is used, the client devices might include an HTTP/HTTPS client commonly referred to as a "browser" for sending and receiving HTTP//HTTPS messages to and from an HTTP//HTTPS server, such as fraud detection system 110 via the network interface component.

Similarly, fraud detection system 110 may host an online platform accessible over network 150 that communicates information to and receives information from the client devices. Such an HTTP/HTTPS server might be implemented as the sole network interface between the client devices and fraud detection system 110, but other techniques might be used as well or instead. In some implementations, the interface between the client devices and fraud detection system 110 includes load sharing functionality. As discussed above, embodiments are suitable for use with the Internet, which refers to a specific global internet of networks. However, it should be understood that other networks can be used instead of the Internet, such as an intranet, an extranet, a virtual private network (VPN), a non-TCP/IP based network, any LAN or WAN, or the like.

The client devices and other components in environment 100 may utilize network 150 to communicate with fraud detection system 110, financial institution 130, and/or ML data set sources 140, which is any network or combination of networks of devices that communicate with one another. For example, network 150 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol. Further, one or more of fraud detection system 110, financial institution 130, and/or ML data set sources 140 may be included by the same system, server, and/or device and therefore communicate directly or over an internal network.

According to one embodiment, fraud detection system 110 is configured to provide webpages, forms, applications, data, and media content to one or more client devices and/or to receive data from the client device(s). In some embodiments, fraud detection system 110 may be provided or implemented in a cloud environment, which may be accessible through one or more APIs with or without a correspond graphical user interface (GUI) output. Fraud detection system 110 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, financial institution 130 and ML data set sources 140, shown in FIG. 1, executes processing logic with processing components to provide data used for ML engines 120 and/or ML drift detectors 126 and/or utilize ML engines 120 and/or ML drift detectors 126 of fraud detection system 110. In some embodiments, this may include providing ML data sets 134 that may be included with ML training data 124 based on new, live, or sequential data processed by financial institution 130, such as additional transaction data for ML fraud detection. In one embodiment, financial institution 130 and ML data set sources 140 includes application servers configured to implement and execute software applications as well as provide related data, code, forms, webpages, platform components or restrictions, and other information associated with data sets for online ML models and concept drift detection, and to store to, and retrieve from, a database system related data, objects, and web page content associated with online ML models and concept drift detection. For example, fraud detection system 110 may implement various functions of processing logic and processing components, and the processing space for executing system processes, such as running applications for ML modeling and/or concept drift detection from data set changes and trends. Financial institution 130 and ML data set sources 140 may be accessible over network 150. Thus, fraud detection system 110 may send and receive data to one or more of financial institution 130 and ML data set sources 140 via network interface components. Financial institution 130 and ML data set sources 140 may be provided by one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

Several elements in the system shown and described in FIG. 1 include elements that are explained briefly here. For example, the client devices could include a desktop personal computer, workstation, laptop, notepad computer, PDA, cell phone, or any wireless access protocol (WAP) enabled device or any other computing device capable of interfacing directly or indirectly to the Internet or other network connection. The client devices may also be a server or other online processing entity that provides functionalities and processing to other client devices or programs, such as online processing entities that provide services to a plurality of disparate clients.

The client devices may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, the client devices and all of its components are configurable using applications, such as a browser, including computer code run using a central processing unit such as an Intel Pentium® processor or the like. However, the client devices may instead correspond to a server configured to communicate with one or more client programs or devices, similar to a server corresponding to fraud detection system 110 that provides one or more APIs for interaction with the client devices in order to submit data sets, select data sets, and perform model modeling operations for an ML system configured for fraud detection.

Thus, fraud detection system 110, financial institution 130, and/or ML data set sources 140 (as well as any client devices) and all of their components might be operator configurable using application(s) including computer code to run using a central processing unit, which may include an Intel Pentium® processor or the like, and/or multiple processor units. A server for fraud detection system 110, financial institution 130, and/or ML data set sources 140 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring fraud detection system 110, financial institution 130, and ML data set sources 140 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Feature Relevance and Concept Drift Detection

Figure 2:
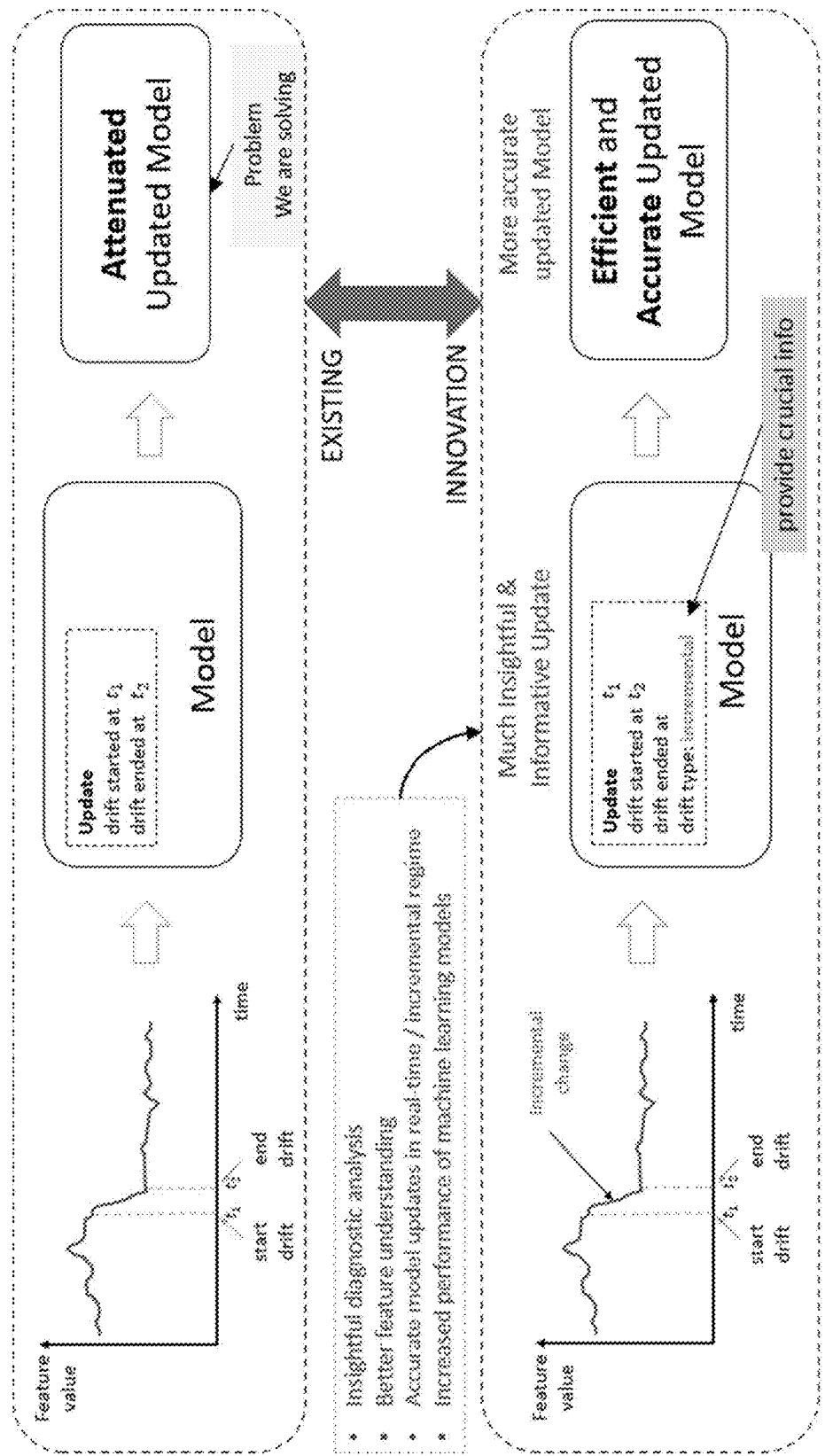
FIG. 2 is a simplified diagram of concept drift detection in machine learning models from changes to feature values according to some embodiments.

FIG. 2 is a simplified diagram 200 of concept drift detection in machine learning models from changes to feature values according to some embodiments. Diagram 200 of FIG. 2 includes an identification of concept drift based on a graph 202 of a feature value change over time based those data sets that may be provided to fraud detection system 110 by financial institution 130 and/or ML data set sources 140 discussed in reference to environment 100 of FIG. 1. In this regard, diagram 200 displays processes for feature ranking and/or relevance to ML models utilized by an ML or other AI system, such as ML models 122 for ML engines 120 of fraud detection system 110 from environment 100. This may include operations for identification of concept drift of ML models. Thus, the blocks in diagram 200 may be utilized to perform concept drift detection during online ML model deployment and training using UB metrics and/or SHAP values.

Initially, an ML model may be trained on historical data to provide a basis for the ML model in a live deployment computing environment where online training of the online ML model may occur. During training, features considered for model inclusion may be determined, such as those features available to an ML platform's decision processes at a time of execution (e.g., available to an ML model trainer and/or decision platform of a service provider). This may include a variety of features describing the transaction and/or the party initiating the transaction, which may be based on variables of the transaction. Data enrichment may occur during preprocessing of data sets to obtain additional information in the training and/or testing data sets. During ML model training and testing, the transaction or other data set may be split into a training data set and a testing data set, and additional sampling and/or data bagging may occur. Data bagging may occur by taking a relative sample size of all features for the ML model (e.g., 500 features where the ML model may include more features from data set variables). Data bagging then trains and/or tests multiple ML models, each configured with the corresponding features, and a combination of the different ML models or a best performing model may be selected for use, deployment, and online training of the online ML model during ensemble training. Sampling of different transactions or other data points that are labeled may also be performed to reduce system bias with uneven data sets. During training and testing, including data bagging, the data points in each data set for training and testing may be excluded for each other to check accuracies and precisions by the ML model. The data points in the training data set may chronologically occur before the data points in each of the test data sets to detect concept drift over time.

Further, data pre-processing steps may be required, which may include data cleaning, sampling, normalizing, determining intersecting columns between data sets, and feature engineering. Model training may then be performed from feature engineering. Feature engineering may be performed by using domain knowledge to extract features from raw data (e.g., variables) in the training data set. For example, date features may be transformed from specific transaction variables, account or user variables, and the like. Features may be based on business logic and/or may be selected by a data scientist or feature engineer. During feature engineering, features may be identified and/or selected based on historically aggregated data for observations and/or transactions.

Thereafter, one or more ML models may be trained for those features to provide an output classifier, such as a classification of transaction fraud. ML models may include different layers, such as an input layer, one or more hidden layers, and an output layer, each having one or more nodes, however, different layers may also be utilized. For example, ML models may include as many hidden layers between an input and output layer as necessary or appropriate. Nodes in each layer may be connected to nodes in an adjacent layer. In this example, ML models receive a set of input values or features and produce one or more output values, such as risk scores and/or fraud detection probability or prediction. However, different and/or more outputs may also be provided based on the training. When ML models are used to, each node in the input layer may correspond to a distinct attribute or input data type derived from the training data.

In some embodiments, each of the nodes in a hidden layer, when present, generates a representation, which may include a mathematical computation (or algorithm) that produces a value based on the input values of the input nodes. The mathematical computation may include assigning different weights to each of the data values received from the input nodes. The hidden layer nodes may include one or more different algorithms and/or different weights assigned to the input data and may therefore produce a different value based on the input values. The values generated by the hidden layer nodes may be used by the output layer node to produce an output value. When an ML model is used, a risk score or other fraud detection classification, score, or prediction may be output from the features. ML models may be separately trained using training data from data bagging, as well as tested and/or updated using data bagged sets for features, where the nodes in the hidden layer may be trained (adjusted) such that an optimal output (e.g., a classification) is produced in the output layer based on the training data. By continuously providing different sets of training data and penalizing ML models when the output is incorrect, ML models (and specifically, the representations of the nodes in the hidden layer) may be trained (adjusted) to improve performance of the models in data classification. Adjusting ML models may include separately adjusting the weights associated with each node in the hidden layer, as well as activation functions of node importance and/or data throughput to a further node.

After creation and during detection of concept drift of the models, model explanation may be performed to understand the importance of features in each model and the importance of the features to the models. Thus, after building the models, an ML model explainer, such as an explanation algorithm, may be used to verify the added value of each separate feature. This may include utilizing SHAP to obtain a measure of importance of each feature in each classification task, as discussed in further detail with regard to FIG. 3. SHAP is applied in order to provide explanation of the model from feature SHAP values. Further, models may also be analyzed to detect concept drift using a metric for UBs in differences between classifications, as discussed in further detail with regard to FIG. 3.

Diagram 200 then includes a detection of concept drift from graph 202 for use in further tuning and updating the trained ML model. Detection of concept drift from graph 202 may be performed based on the changes to UB metrics and/or SHAP values over time. For example, time axis 204 shows plots over time of feature values from feature value axis 206, which shows a line graph of such changes over time of feature importance, relevance, or contribution to an output classification by the ML model. An incremental change 208 may be found where point plots on feature value axis 206 varies significantly (e.g., at or over a threshold amount of change, value, or ratio) from a start drift time 210 of $t_1$ to an end drift time of 212 $t_2$. Identification and characterization of concept drift is discussed in further detail with regard to FIG. 3.

After detection of incremental change 208 from graph 202, an update alert 214 may be generated. Update alert 214 includes an update notification to update a model 216 associated with the concept drift detected from graph 202. In this regard, model 216 may correspond to an online ML model that is to be updated, or at least alerted of concept drift in a feature's data variables, based on the additional informative update data from update alert 214. The informative update data may include start drift time 210 of $t_1$, end drift time 212 of $t_2$, and drift type shown as incremental. Additional data may also be provided for proper ML model updating, such as the amount of concept drift, identified features for feature value axis 206, and the like. Thereafter, an updated model 218 that is efficiently and accurately updated from update alert 214 may be output from diagram 200.

Figure 3:
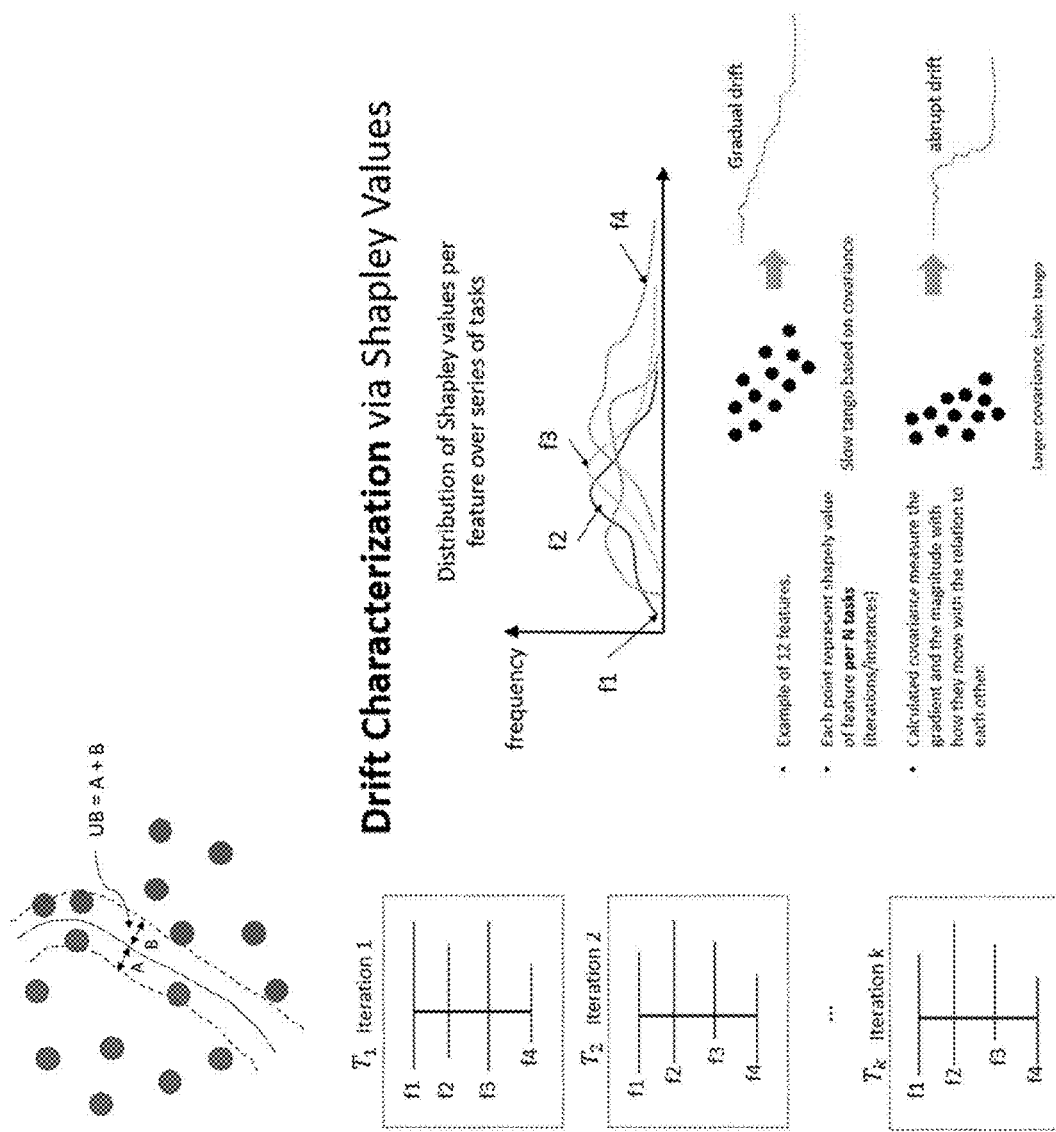
FIG. 3 is a simplified diagram of concept drift detection and characterization in machine learning models from Uncertain Bounds and/or Shapley values according to some embodiments.

FIG. 3 is a simplified diagram 300 of concept drift detection and characterization in machine learning models from Uncertain Bounds and/or Shapley values according to some embodiments. In this regard, diagram 300 in FIG. 3 shows outputs from UBs as a margin density metric and SHAP values as indicators and classifications of concept drift. After training and model explanation (e.g., identification of a delta or change in UB and/or calculation of Shapley values for features of each ML model), changes in computed classifiers for input data and feature contribution may be determined, which may vary from transaction to transaction and across different models and different transactions as data sets trend and change over time. In this regard, diagram 300 includes a UB 302 for classifiers from different subsets of features used during data bagging and SHAP values 310 changing over time in order to identify and characterize concept drift.

A change or delta in UBs determined for classifiers from multiple trained ML models based on training and test data sets may serve as an indicator for concept drift. For example, in diagram 300, UB 302 include two classes or classifications of input data, such as whether transactions are labeled or classified as fraudulent or not. In this regard, with UB 302, a decision borderline 304 may be seen, which may correspond to clustering, a measurement, or a metric that may separate the two classifications of the classes shown to the right and left of decision borderline 304. Thereafter a UB A 306 and a UB B 308 are shown as supportive lines that each create a buffer zone corresponding to the UB 302 where classifications fall on each side of decision borderline 304 but may be uncertain decisions or classifications due to falling nearby decision borderline 304 and within UB A 306 and UB B 308. This may cause error in ML model training, observed variance and/or uncertainty, and/or concept drift.

For example, classifiers generally may not have a corresponding notion of margin, and therefore to make ML models more robust and distribute weights across features, a feature bagging ensemble technique may be used during ML model building, training, and testing. Feature bagging may correspond to training multiple base models for a classifier (e.g., transaction is fraudulent or not) using a subset of the features selected for an ML model from the original D-dimensional data space of the variables corresponding to those features. Ensemble training may later include selecting a specific one of the multiple trained ML models that is most accurate and/or combining the trained ML models, decision trees, weights, and the like to create an "ensemble" trained ML model.

In order to use UBs as an indicator of drift, these synthetic data sets may be generated and evaluated on different change scenarios. For example, a change scenario may be setup by generating an initial distribution of 500 samples of data for features, used for training a model, and then generating 500 additional samples from a changed distribution of the data for those features (e.g., from sequential or newer data sets), for testing the model. An UB metric may then be evaluated as a difference in the UBs of the training and test data sets. Thus, the metric of UB 302 may be calculated as the sum of distance A and B for UB A 306 and UB B 308, respectively, as UB=A+B. With the training and test data sets, including any further test data sets from sequential, new, or additional online data, a metric of the change in UB may be calculated as follows: $\Delta UB = |UB_{Train} - UB_{Test}|$. The ratio value may then be compared to the range and threshold to identify concept drift. This metric may correspond to a margin density metric, as a ratio between 0-1, that indicates concept drift when meeting or exceeding the threshold value.

Further in diagram 300, SHAP or Shapley values may be used for content drift detection and characterization, such as sudden, incremental, gradual, recurring, a blip, and/or noise. SHAP values may be used to measure impact, importance, and/or relevance of each feature to the corresponding ML model when classifying input feature data. For example, each feature may have a corresponding contribution to a final decision or classification of the input feature data, and therefore SHAP values estimate the strength of each contribution relative to the contributions of other features. Calculation of SHAP or Shapley values may be performed using the following Equation 1:

$$\varphi_x(v) = \frac{\frac{1}{p}\sum v(S \cup \{m\}) - v(S)}{\binom{p-1}{k(S)}} \quad \text{Equation 1}$$

T: feature space
p: cardinality of feature space
v=v(T): total feature contribution through feature space, among features
$\varphi_x(v)$: shapley value that is a share given to each feature m
S: subset of T after excluding feature m
k(S): size of S
v(S): value achieved by subset S
v(S∪{m}): realized value after feature m joins S Thus, a SHAP algorithm is applied to the features for the ML models that have been selected and used to modify the output score, prediction, or classification. The SHAP algorithm may apply a game theory-based approach to explain the output of an ML model. In some embodiments, this algorithm may be model agnostic and may be applied on supervised as well as unsupervised models. SHAP qualifies the contribution that each feature brings to the outcome classification or output by an ML model. Thus, SHAP quantifies the contribution that each feature brings to the prediction made by the model. This allows for generation of SHAP values 310 each feature contributing to the output by the ML model using different training and/or testing data sets using the SHAP algorithm. Features contribute to an ML model's output or prediction with a magnitude and sign is accounted for by Shapley values and scores. Accordingly, SHAP values 310 represent estimates of feature importance (magnitude of the contribution) and the direction to the contribution (e.g., as positive or negative sign). Features with a positive sign contribute to the prediction of activity (e.g., fraudulent), whereas features with a negative sign contribute to the prediction of inactivity (i.e., negative contribution to activity prediction or non-fraudulent).

Aggregated SHAP scores from SHAP values 310, and/or other information, may be used to quantify and/or visualize the features of importance to ML models as changes over time. SHAP values 310 show calculated SHAP values for features f1, f2, f3, and f4 at different times $T_1$, $T_2$, to $T_k$, which identifies variance in values from different training and/or testing data sets. For example, graph 312 shows feature values changing over time for features f1-f4. This allows visualization and characterization of detected concept drift. Characterization of a type of concept drift may be done using plots of SHAP values of each feature per N tasks, such as 12 tasks over a time period. In this regard, a first plot 314 may be used to calculate a first covariance measure 316 that indicates a gradual drift as the type of content drift. A second plot 318 may be used to calculate a second covariance measure 320 that indicates an abrupt drift for the type of content drift. Calculation of Kullback-Leibler divergence from SHAP values 310 may be performed using the following Equation 2:

$$D_{KL}(P\|Q) = -\sum_{i=1}^{n} P(x_i)\log\left(\frac{Q(x_i)}{P(x_i)}\right) \quad \text{Equation 2}$$

$$SSE(P, Q) = \sum_{i=1}^{n}(P(x_i) - Q(x_i))^2$$

By applying SHAP, determining SHAP values 310, and calculating Kullback-Leibler divergence from SHAP values 310, calculation of covariance between SHAP values 310 may be performed using the following Equation 3:

$$\text{cov}(x, y) = \frac{\sum_{i}^{n}(x_i - \mu) \cdot (y_i - \mu)}{N} \quad \text{Equation 3}$$

Thus, these equations may be used for determination of first plot 314, first covariance measure 316, second plot 318, and second covariance measure 320. This allows for concept drift characterization using SHAP values.

Figure 4:
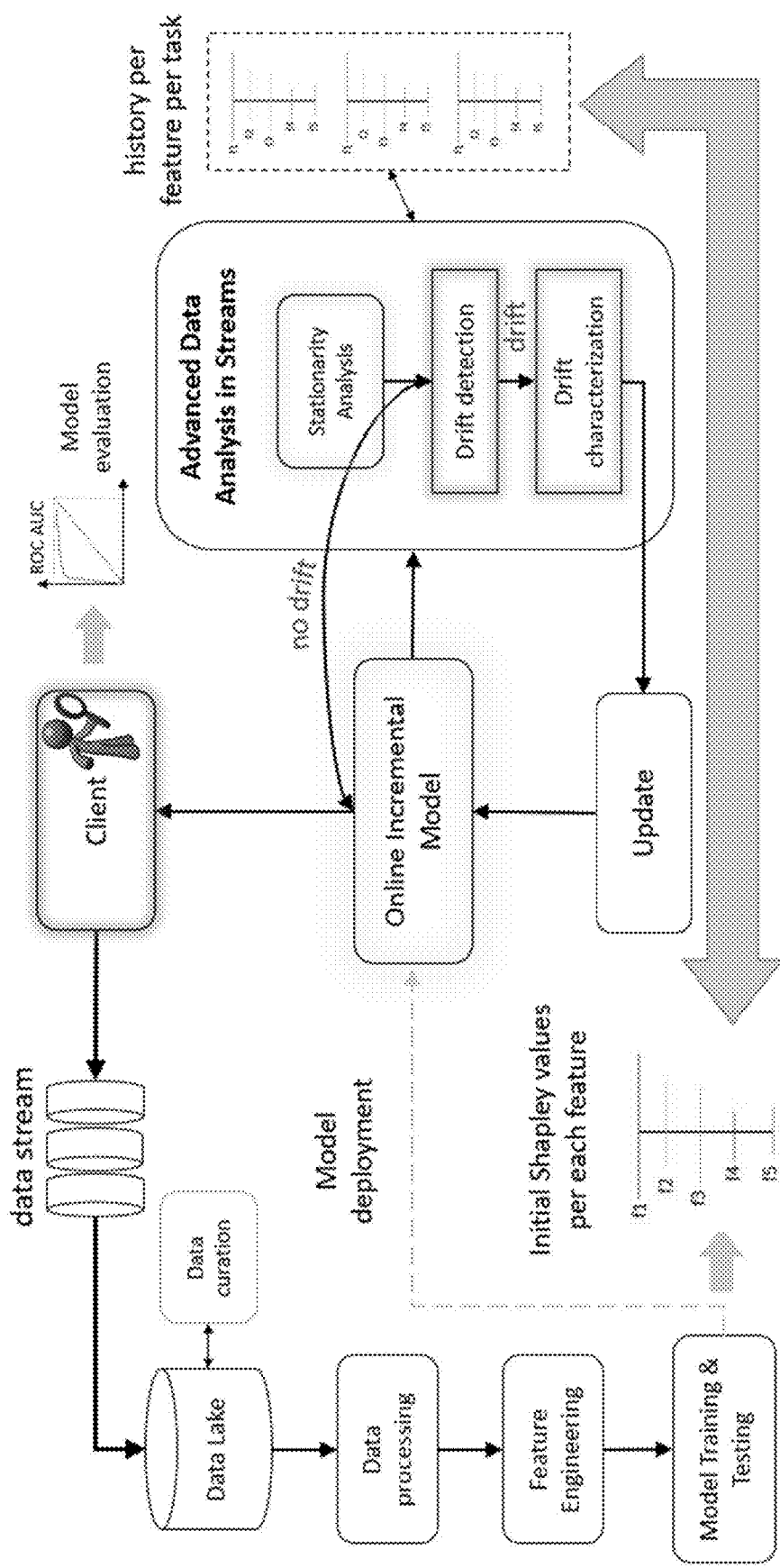
FIG. 4 is a simplified system architecture for detecting concept drift in machine learning models according to some embodiments.

FIG. 4 is a simplified system architecture 400 for detecting concept drift in machine learning models according to some embodiments. In this regard, system architecture 400 shows initial training of an ML model on historical data, deployment in an online production computing device of the ML model, and drift detection for model tuning and further training of concept drift in feature relevance to model classifications and/or predictions. In this regard, system architecture 400 displays components that may be used for these operations, such as those for use with ML models 122 of ML engines 120 for fraud detection system 110 from environment 100 of FIG. 1.

A client 402 may interact with the components of the fraud detection or other service provider system in system architecture 400 to establish and initially train an ML model based on historical data, which may correspond to static past data and/or initially fed labeled or unlabeled data. Client 402 may interact with data stream 404 for historical data, such as past transaction data used for initially training a baseline of an ML model for fraud detection or other risk analysis. Data stream 404 may provide data from a data lake 406, which may include a data curation 408 of historical training data used for the initial ML model training (e.g., data selection, labeling, sampling, or the like of past transaction data). Data processing 410 and feature engineering 412 may be performed on the historical training data and features used as an input layer for the ML model. This may include preparing data for performing hidden layer training to make classifications or predictions at an output layer. Thereafter, model training and testing 414 may be performed to initial train the ML model, test the initially trained model, and perform model deployment 416. During model deployment 416, initial SHAP values 418 per each feature of and online incremental model 420 (e.g., from feature engineering 412) may be determined and stored for use during later concept drift detecting and alerting of such drift with online incremental model 420.

Thereafter, online incremental model 420 may be deployed, monitored, and analyzed for concept drift detection and determination of whether ML model updating is required. Initial SHAP values 418 may be analyzed with additional SHAP values 422 corresponding to a history of SHAP values per each feature for each additional task based on incremental, sequential, and/or additional online data sets used by the ML model over time. Additional SHAP values 422 may therefore be calculated on additional data sets, such as those that may sequentially or chronologically occur after the data sets for initial SHAP values 418. Initial SHAP values 418 and additional SHAP values 422 may be used by a data analysis component 424 from the data streams of incoming transactions or other data sets over time. Data analysis component 424 includes a stationary analysis 426, a drift detection 428 for online incremental model 420, and drift characterization 430 for detected concept drifts with features of online incremental model 420. When detecting concept drift, stationary analysis 426 may be performed for online incremental model 420 based on UB metrics and/or initial SHAP values 418 with additional SHAP values 422 to determine whether changes in such metrics and/or values cause drift detection 428 to identify sufficient concept drift required to alert for ML model updating of online incremental model 420. If drift detection 428 detects sufficient concept drift to alert an ML model updater of the concept drift for ML model updating of online incremental model 420, drift characterization 430 may be executed to detect the type and/or characterization of the concept drift from covariance in SHAP values for each feature's plotted task results over history (e.g., based on initial SHAP values 418 and additional SHAP values 422).

Drift detection 428 and drift characterization 430 may then generate an alert, system message, data file or the like for an update 432. Update 432 may be generated by data analysis component 424, which may include the alert of the detected concept drift, as well as data needed to identify when the concept drift occurred (e.g., start and/or end time), the data causing the concept drift, the type of concept drift (e.g., whether sudden, gradual, a blip that does not reoccur, noise, etc.), and the like. Update 432 may then be output, transmitted to, and/or deployed as an ML model update paradigm for an ML model updater, which may interface with online incremental model 420 for determination of whether and how to perform ML model updating. Thus, the ML model update paradigm may include the alert for the identified concept drift and characterization of the concept drift, as well as other needed features.

Figure 5:
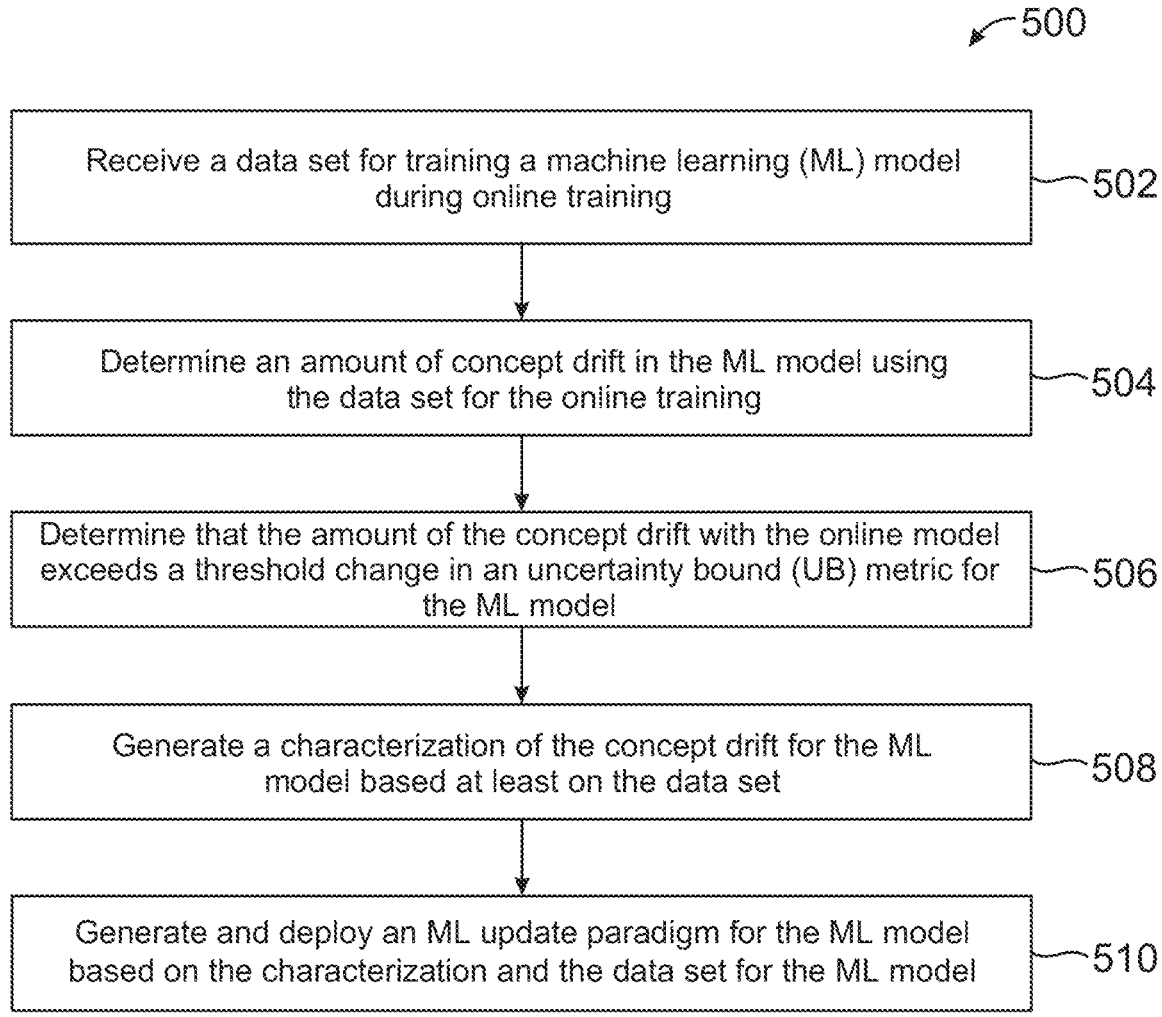
FIG. 5 is a simplified diagram of an exemplary flowchart for detecting and notifying machine learning model systems of concept drift caused by online training with live data according to some embodiments.

FIG. 5 is a simplified diagram of an exemplary flowchart 500 for detecting and notifying machine learning model systems of concept drift caused by online training with live data according to some embodiments. Note that one or more steps, processes, and methods described herein of flowchart 500 may be omitted, performed in a different sequence, or combined as desired or appropriate based on the guidance provided herein. Flowchart 500 of FIG. 5 includes operations for training an ML system and detecting concept drift when training with live online data, as discussed in reference to FIG. 1-4. One or more of steps 502-510 of flowchart 500 may be implemented, at least in part, in the form of executable code stored on non-transitory, tangible, machine-readable media that when run by one or more processors may cause the one or more processors to perform one or more of steps 502-510. In some embodiments, flowchart 500 can be performed by one or more computing devices discussed in environment 100 of FIG. 1.

At step 502 of flowchart 500, a data set for training an ML model during online training is received. The data set may be received after initial baseline training of the ML model and during incremental and/or online training of the ML model using live data or further data sets over time. Thus, the data set may correspond to a newer or more recent data set. The data set may include values for different variable of ML model features, which may also be segmented by and/or correspond to data bagging techniques performed on a subset of the features used to train different ML models for an ensemble training technique. The data set may be received over a course of time during testing of the ML model for concept drift detection.

At step 504, an amount of concept drift in the ML model is determined using the data set for online training. Determining whether concept drift occurs may include identifying an amount, ratio, or value in change of feature importance and/or UBs for the ML model. For example, feature importance may be used for concept drift detection using SHAP values and changes in SHAP value for feature importance over time. UBs may be used for concept drift detection by calculating a delta in an UB metric for classifiers by different ML models trained using the data bagging technique on subsets of the features from ML model feature engineering. This may be compared to a threshold or rate of change to identify whether concept drift has occurred. At step 506, it is determined that the amount of the concept drift with the online model exceeds a threshold change in an uncertainty bound metric for the ML model. Thus, the amount(s) of concept drift may be determined from step 504 to identify the occurring concept drift with one or more of the features of the ML model.

At step 508, a characterization of the concept drift for the ML model is generated based at least on the data set. SHAP values for features of the ML model may be processed and plotted to identify a type or other characterization of the concept drift for the ML model. For example, the SHAP values for a feature may be plotted and/or processed to determine a divergence, which may then be used for covariance determination between the feature's SHAP values at different times based on input feature data. Based on the degree of covariance and/or change over time, a type or characterization of the concept drift may be identified.

At step 510, an ML model update paradigm is generated and deployed for the first ML model based on the characterization and the data set for the ML model. An alert, that includes the ML model update paradigm, may be generated for an ML model updater. The ML model update paradigm may include information about the concept drift timing and data sets, the amount of concept drift, the characterization of the concept drift, and/or other data associated with the processed data sets. Thereafter, the alert with the ML model update paradigm may be output to the ML model updater, which may be configured to determine when, whether, and how to perform ML model updating of the online ML model.

Figure 6:
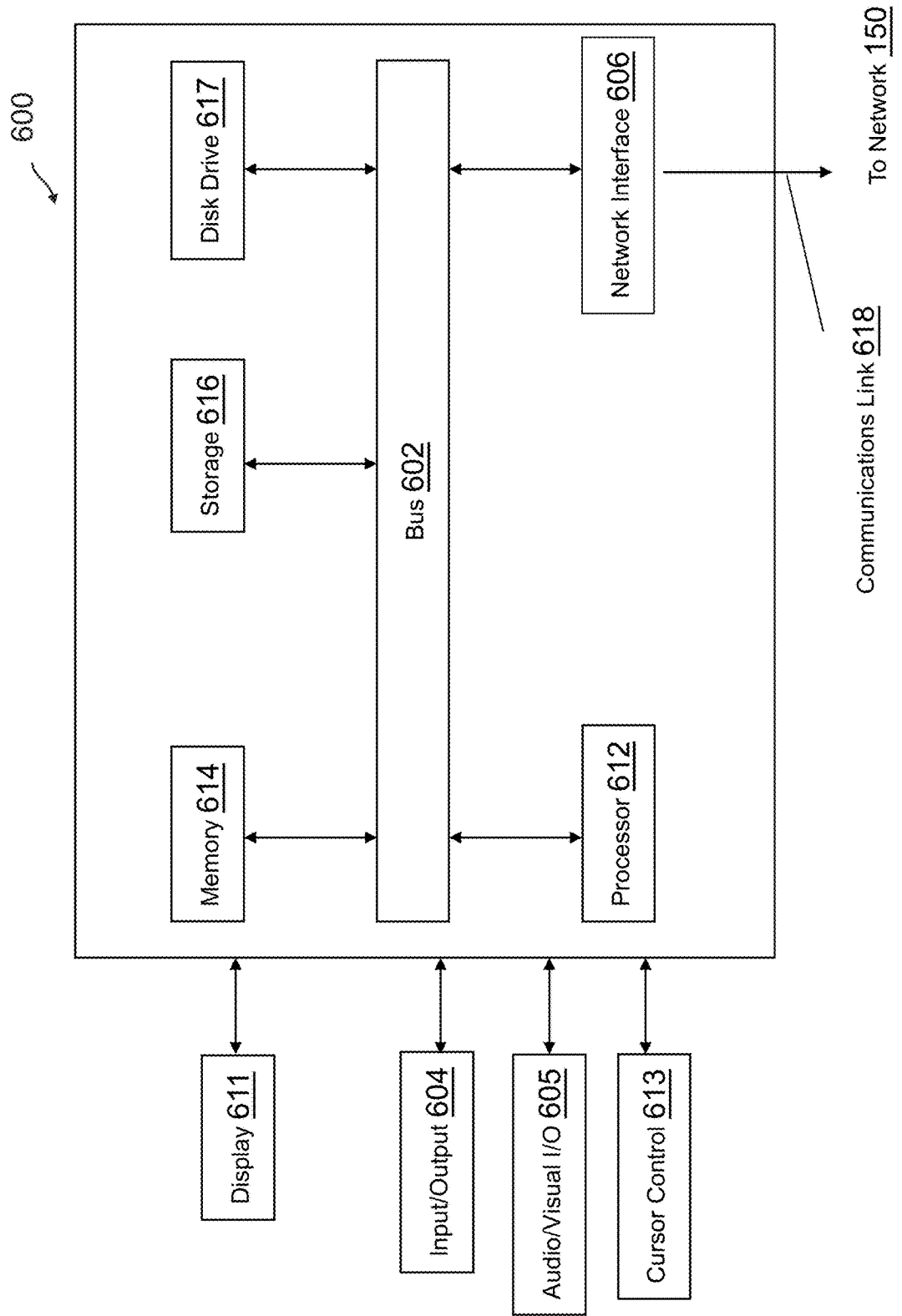
FIG. 6 is a simplified diagram of a computing device according to some embodiments.

As discussed above and further emphasized here, FIGS. 1, 2, 3, 4, and 5 are merely examples of fraud detection system 110 and corresponding methods for detection of concept drift detection during online ML model deployment and training, which examples should not be used to unduly limit the scope of the claims. One of ordinary skill in the art would recognize many variations, alternatives, and modifications.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A machine learning (ML) system configured to detect concept drift in ML models during ML model operations using live data, the ML system comprising:

a processor and a computer readable medium operably coupled thereto, the computer readable medium comprising a plurality of instructions stored in association therewith that are accessible to, and executable by, the processor, to perform drift detection operations which comprise:

receiving a first data set associated with the live data for use during online training of a first ML model of the ML models;

determining a change to an uncertainty bound metric associated with classifiers for features utilized by the first ML model based on the first data set and at least one second data set from previous data utilized with training the first ML model;

identifying that the first data set causes the concept drift with the online training of the first ML model based on the change to the uncertainty bound metric;

determining characterization information about a type of the concept drift based at least on the change to the uncertainty bound metric, wherein the characterization information is associated with the features utilized by the first ML model;

generating an ML update paradigm based on the concept drift of the first ML model and the characterization information; and alerting an ML model updater of the ML update paradigm.

2. The ML system of claim 1, wherein determining the change to the uncertainty bound metric comprises:

calculating a SHAP Additive exPlanation (SHAP) value of each of the features utilized by the first ML model for a corresponding one of the classifiers;

calculating comparisons of the SHAP values of the features to previous SHAP values of the features to the classifiers of the first ML model; and calculating covariances between the SHAP values and the previous SHAP values using the comparisons, wherein the change is determined based on the calculated comparisons and the calculated covariances.

3. The ML system of claim 2, wherein the drift detection operations further comprise:

determining that the change to the uncertainty bound metric exceeds a threshold change, wherein threshold change indicates a degradation in performance of the first ML model or a fluctuation in model performance of the first ML model, wherein the characterization information comprises at least one of a type or a degree of the concept drift based on the SHAP values and the change exceeding the threshold change.

4. The ML system of claim 3, wherein the change comprises a delta change value for margin densities between the first data set associated with the live data and the at least one second data set from the previous data.

5. The ML system of claim 2, wherein the drift detection operations comprise:

determining at least one of a shape, a curvature, or a slope of each of the covariances; and determining the concept drift based on the at least one of the shape, the curvature, or the slope of each of the covariances, wherein the first data set is identified as causing the concept drift based on determining the concept drift.

6. The ML system of claim 5, wherein determining the characterization information comprises:

generating a model explanation output based on at least one of the SHAP values or a ranking of each of the features for each of the classifiers of the first ML model, wherein the characterization information comprises the model explanation output.

7. The ML system of claim 1, wherein the ML models comprise a plurality of fraud assessment models for a risk assessment engine utilizing the ML models with a financial system.

8. The ML system of claim 1, wherein the drift detection operations further comprise:

generating a recommended adjustment to at least one of the first ML model or a second ML model for the concept drift based on at least one of the ML update paradigm or the change to the uncertainty bound metric; and outputting the recommended adjustment to the ML model updater.

9. A method to detect concept drift in ML models during ML model operations using live data, the method comprising:

receiving a first data set associated with the live data for use during online training of a first ML model of the ML models;

determining a change to an uncertainty bound metric associated with classifiers for features utilized by the first ML model based on the first data set and at least one second data set from previous data utilized with training the first ML model;

identifying that the first data set causes the concept drift with the online training of the first ML model based on the change to the uncertainty bound metric;

determining characterization information about a type of the concept drift based at least on the change to the uncertainty bound metric, wherein the characterization information is associated with the features utilized by the first ML model;

generating an ML update paradigm based on the concept drift of the first ML model and the characterization information; and alerting an ML model updater of the ML update paradigm.

10. The method of claim 9, wherein determining the change to the uncertainty bound metric comprises:

calculating a SHAP Additive exPlanation (SHAP) value of each of the features utilized by the first ML model for a corresponding one of the classifiers;

calculating comparisons of the SHAP values of the features to previous SHAP values of the features to the classifiers of the first ML model; and calculating covariances between the SHAP values and the previous SHAP values using the comparisons, wherein the change is determined based on the calculated comparisons and the calculated covariances.

11. The method of claim 10, further comprising:

determining that the change to the uncertainty bound metric exceeds a threshold change, wherein threshold change indicates a degradation in performance of the first ML model or a fluctuation in model performance of the first ML model, wherein the characterization information comprises at least one of a type or a degree of the concept drift based on the SHAP values.

12. The method of claim 11, wherein the change comprises a delta change value for margin densities between the first data set associated with the live data and the at least one second data set from the previous data.

13. The method of claim 10, further comprising:

determining at least one of a shape, a curvature, or a slope of each of the covariances; and determining the concept drift based on the at least one of the shape, the curvature, or the slope of each of the covariances, wherein the first data set is identified as causing the concept drift based on determining the concept drift.

14. The method of claim 13, wherein determining the characterization information comprises:

generating a model explanation output based on at least one of the SHAP values or a ranking of each of the features for each of the classifiers of the first ML model, wherein the characterization information comprises the model explanation output.

15. The method of claim 9, wherein the ML models comprise a plurality of fraud assessment models for a risk assessment engine utilizing the ML models with a financial system.

16. The method of claim 9, further comprising:
generating a recommended adjustment to at least one of the first ML model or a second ML model for the concept drift based on at least one of the ML update paradigm or the change to the uncertainty bound metric; and
outputting the recommended adjustment to the ML model updater.

17. A non-transitory computer-readable medium having stored thereon computer-readable instructions executable to detect concept drift in ML models during ML model operations using live data, the computer-readable instructions executable to perform drift detection operations which comprises:
receiving a first data set associated with the live data for use during online training of a first ML model of the ML models;
determining a change to an uncertainty bound metric associated with classifiers for features utilized by the first ML model based on the first data set and at least one second data set from previous data utilized with training the first ML model;
identifying that the first data set causes the concept drift with the online training of the first ML model based on the change to the uncertainty bound metric;
determining characterization information about a type of the concept drift based at least on the change to the uncertainty bound metric, wherein the characterization information is associated with the features utilized by the first ML model;
generating an ML update paradigm based on the concept drift of the first ML model and the characterization information; and
alerting an ML model updater of the ML update paradigm.

18. The non-transitory computer-readable medium of claim 17, wherein determining the change to the uncertainty bound metric comprises:
calculating a SHAP Additive exPlanation (SHAP) value of each of the features utilized by the first ML model for a corresponding one of the classifiers;
calculating comparisons of the SHAP values of the features to previous SHAP values of the features to the classifiers of the first ML model; and
calculating covariances between the SHAP values and the previous SHAP values using the comparisons,
wherein the change is determined based on the calculated comparisons and the calculated covariances.

19. The non-transitory computer-readable medium of claim 18, wherein the drift detection operations further comprise:
determining that the change to the uncertainty bound metric exceeds a threshold change, wherein threshold change indicates a degradation in performance of the first ML model or a fluctuation in model performance of the first ML model,
wherein the characterization information comprises at least one of a type or a degree of the concept drift based on the SHAP values.

20. The non-transitory computer-readable medium of claim 19, wherein the change comprises a delta change value for margin densities between the first data set associated with the live data and the at least one second data set from the previous data.

* * * * *